United States Patent [19]

Miyazaki et al.

[11] Patent Number: 5,343,460
[45] Date of Patent: Aug. 30, 1994

[54] INFORMATION PROCESSING DEVICE AND INFORMATION PROCESSING METHOD

[75] Inventors: Toshihiko Miyazaki, Hiratsuka; Kunihiro Sakai, Isehara; Hiroyasu Nose, Zama; Etsuro Kishi, Kawasaki; Ryo Kuroda, Machida, all of Japan

[73] Assignee: Canon Kabushiki Kaisha, Tokyo, Japan

[21] Appl. No.: 738,427

[22] Filed: Jul. 31, 1991

[30] Foreign Application Priority Data

Aug. 3, 1990 [JP] Japan .................. 2-206617

[51] Int. Cl.5 .................................. G11B 9/00
[52] U.S. Cl. ............................. 369/126; 369/13; 369/100; 250/306
[58] Field of Search ............. 369/126, 13, 18, 100; 365/110, 113, 114, 118, 151, 112; 430/495; 250/306; 356/317; 360/114

[56] References Cited

U.S. PATENT DOCUMENTS

| | | | |
|---|---|---|---|
| 4,604,520 | 8/1986 | Pohl | 250/216 |
| 4,662,747 | 5/1987 | Isaacson et al. | 356/317 |
| 4,684,206 | 8/1987 | Bednorz et al. | 350/96.12 |
| 4,918,309 | 4/1990 | Beha et al. | 250/306 |
| 4,933,926 | 6/1990 | Tabei et al. | 365/112 |
| 4,956,812 | 9/1990 | Seya et al. | 365/119 |
| 4,985,627 | 1/1991 | Gutierrez et al. | 250/306 |
| 5,018,865 | 5/1991 | Ferrell et al. | 356/376 |
| 5,038,321 | 8/1991 | Van Zeghbroeck | 365/106 |
| 5,055,936 | 10/1991 | Takanashi et al. | 365/112 |
| 5,091,880 | 2/1992 | Isono et al. | 365/151 |
| 5,093,822 | 3/1992 | Kugiya et al. | 369/121 |
| 5,128,893 | 7/1992 | Takanashi et al. | 365/112 |
| 5,134,605 | 7/1992 | Goldberg et al. | 369/126 |
| 5,144,581 | 9/1992 | Toda et al. | 365/151 |
| 5,161,147 | 11/1992 | Goldberg et al. | 369/100 |
| 5,179,533 | 1/1993 | Bullington et al. | 365/110 |
| 5,191,574 | 3/1993 | Henshaw et al. | 369/100 |
| 5,192,631 | 3/1993 | Inoue et al. | 430/56 |

FOREIGN PATENT DOCUMENTS

| | | |
|---|---|---|
| 0112402 | 7/1984 | European Pat. Off. |
| 0296262 | 12/1988 | European Pat. Off. |
| 0335487 | 10/1989 | European Pat. Off. |
| 0363147 | 4/1990 | European Pat. Off. |
| 63-161552 | 7/1988 | Japan. |
| 63-161553 | 7/1988 | Japan. |
| WO9004753 | 5/1990 | PCT Int'l Appl. |

OTHER PUBLICATIONS

Binning, et al., "Surface Studies by Scanning Tunneling Microscopy," Physical Review Letters, vol. 49, No. 1, Jul. 1982, pp. 57 through 60.

Dürig, et al., "Near-Field Optical-Scanning Microscopy," Journ. Appl. Phys., vol. 59, No. 10, May 1986, pp. 3318 through 3327.

Primary Examiner—Paul M. Dzierzynski
Assistant Examiner—David V. Bruce
Attorney, Agent, or Firm—Fitzpatrick, Cella, Harper & Scinto

[57] ABSTRACT

Information is recorded by providing a recording medium having a recording layer on an electroconductive substrate transmitting an electromagnetic wave and an electroconductive optical probe arranged proximate to the recording medium, and applying a voltage between the substrate and the optical probe. The recorded information is read by irradiating an electromagnetic wave, preferably with a plurality of wavelengths, on the recording layer from the substrate side, and detecting with the optical probe an electromagnetic wave oozed out on the surface of the recording layer.

13 Claims, 1 Drawing Sheet

INFORMATION PROCESSING DEVICE AND INFORMATION PROCESSING METHOD

BACKGROUND OF THE INVENTION

1. Field of the invention

This invention relates to a novel information processing device and an information processing method which perform recording or erasing of information by voltage application and perform reproduction of information by detecting an evanescent wave.

Also, the present invention relates to an information processing device and an information processing method which is improved in S/N ratio in reproduction of information which is performed by detecting an evanescent wave.

2. Related Background Art

In recent years, uses of memory materials constitute the nuclei of electronics industries such as computers and their related instruments, video discs, digital audiodiscs, etc., and the developments of such materials have been extremely actively progressed. The performances demanded for memory materials, which depend on the uses, may include generally:

(1) high density and large recording capacity;
(2) rapid response speed of recording and reproduction;
(3) small power consumption;
(4) high productivity and low cost, etc.

These materials have been heretofore primarily semiconductor memories or magnetic memories by use magnetic materials or semiconductors as the base material, but with the progress of the laser technique in recent years, an inexpensive and high density recording medium with an optical memory by use of an organic thin film such as an organic dye, a photopolymer, etc. has been developed.

On the other hand, the scanning tunneling microscopy (hereinafter abbreviated as STM) that can observe directly the electron structure of surface atoms/molecules of a conductor with a resolving power of 0.1 nm has been developed [G. Binning et al., Phys. Rev. Lett. 49, 57 (1982)]. There has been made a proposal concerning a recording-reproduction device which performs writing-reading onto a recording medium with a bit size of atomic/molecular order (0.5 to 50 nm) by use of the tunnel current applying the principle of STM [for example, Japanese Patent Application Laid-Open Nos. 63-161552 and 63-161553].

Also, as further development of STM, there have been developed a near field scanning optical microscope (NFOM) which examines the surface state of a sample by utilizing the evanescent wave oozed out from a fine opening smaller than the wavelength of the light at the pointed tip end of a probe to which light introduced from the opposite direction [Durig et al., J. Appl. Phys., 59, 3318 (1986)] or the photon scanning tunneling microscopy (PSTM) that permits light to enter from the back surface of a sample through a prism under the condition of total reflection, and detecting the evanescent wave oozed out to the sample surface [Reddick et al., Phys. Rev. B39, 767 (1989)]. By applying the principle of NFOM and utilizing an evanescent wave, there has been made a proposal concerning a recording-reproduction device which performs writing onto a recording medium and reading therefrom [U.S. Pat. No. 4,684,206].

However, of those which have been practically applied in the above prior art examples, even in the optical memory with the highest density and the largest recording capacity, the limit of recording capacity is $10^8$ bit/cm$^2$, which is becoming no longer sufficient for image recording in computers or video instruments in recent years, etc.

In an attempt which performs recording and reproduction by accessing to one molecule, although the bit size of recording may be on an atomic/molecular order (0.5 to 50 nm), in such recording wherein a part of the structure within the molecular order changes, the influence of the recorded state on the tunnel current is local, whereby reproduction can be done with difficulty. Further, since there is also the possibility to change the recorded state by the operation of reproduction, it can hardly be said as being sufficiently applicable to a memory.

Also, in the attempt of recording and reproduction by use of NFOM as described above, the evanescent wave was weak in intensity for performing stable writing of information, and if the optical intensity is made stronger, there has been involved the problem that the bit diameter becomes larger.

If both recording and reproduction are performed by use of the evanescent wave, there also has been the problem that the written state is changed by the reproduction light.

Further, in reproduction of an evanescent wave by use of a single wavelength, there has been no method of distinguishing the unevenness of the substrate or medium surface from the recorded state, and therefore the S/N ratio is liable to be worsened, and reproducibility and stability cannot be said to be sufficient.

SUMMARY OF THE INVENTION

Accordingly, an object of the present invention is to provide an information processing device and an information processing method enabling stable writing and reading of information, which are information process utilizing an evanescent wave.

It is also another object of the present invention to provide an information processing device and an information processing method improved in S/N ratio in reproduction of information performed by utilizing an evanescent wave.

The above objects can be accomplished by the present invention as described below.

More specifically, the present invention is an information processing device, comprising a recording medium having a recording layer provided on a substrate which transmits an electromagnetic wave and has electroconductivity, an electroconductive optical probe arranged proximate to said recording layer of said recording medium, a means for applying voltage between said substrate and said optical probe, a means for irradiating an electromagnetic wave on said substrate and a means for detecting the electromagnetic wave entering said optical probe.

Also, the present invention is an information processing device comprising a recording medium having a recording layer provided on a substrate which transmits an electromagnetic wave and has electroconductivity, an electroconductive optical probe arranged proximate to said recording layer of said recording medium, a means for applying voltage between said substrate and said optical probe, a means for irradiating electromagnetic waves with a plurality of wavelengths on said substrte and a means for detecting the electromagnetic waves with the plurality of wavelengths entering said optical probe.

Further, the present invention is an information processing method which comprises recording information by approximating an electroconductive optical probe to a recording medium having a recording layer provided on a substrate which transmits an electromagnetic wave and has electroconductivity and applying a voltage between said substrate and said optical probe, and reading the recorded information by irradiating an electromagnetic wave on said recording medium from said substrate side and detecting the electromagnetic wave oozed out on the surface of said recording medium by said optical probe.

Further, the present invention is an information processing method, which comprises recording information by approximating an electroconductive optical probe to a recording medium having a recording layer provided on a substrate which transmits an electromagnetic wave and has electroconductivity and applying voltage between said substrate and said optical probe, and reading the recorded information by irradiating electromagnetic waves with a plurality of wavelengths on said recording medium from said substrate side and detecting the electromagnetic waves oozed out on the surface of said recording medium by said optical probe.

Further, the present invention is an information processing device, comprising a recording medium having information recorded thereon, an optical probe arranged proximate to one side of said recording medium, a means for irradiating electromagnetic waves with a plurality of wavelengths to the other side of said recording medium and a means for detecting the electromagnetic waves with the plurality of wavelengths entering said optical probe.

Further, the present invention is an information processing method, which comprises irradiating electromagnetic waves with a plurality of wavelengths on the back surface of a recording medium having information recorded thereon, and reading the recorded information by detecting the electromagnetic waves with the plurality of wavelengths oozed out on the surface of said recording medium.

STM utilizes the phenomenon that a tunnel current will flow when a probe of a metal (probe electrode) and an electroconductive substance are approached to a distance of about 1 nm with an application of a voltage therebetween. Such current is very sensitive to the distance change therebetween, and by scanning the probe so as to maintain constantly the tunnel current, the surface structure of the real space can be drawn and at the same time various information concerning the entire electron cloud of the surface atoms can be read. In this case, the resolving power in the interplanar direction is about 0.1 nm. Therefore, by utilizing the principle of STM, it is possible to perform high density recording sufficiently at the atomic order (sub-nanometer). For example, when the bit size of recording is made 10 nm, a recording device with a density as high as $10^{12}$ bit/cm$^2$ is obtained.

PSTM which is a further development of STM utilizes the weak light leaked out from the surface of the sample. A laser is permitted to enter from the backside of the sample through a prism, and the angle is controlled so that the laser may be totally reflected at the back surface of the sample. Most of the light is reflected, but only a part will pass through the surface to the surface side by the tunnel effect in spite of the condition of total reelection. This is the light called an "evanescent wave", with the wavelength being equal to the incident light and the intensity becoming about 1/1000 to 1/100,000 of that of the incident light. The intensity of the evanescent wave is weaker farther from the surface of the sample, and by approximating the optical fiber to the sample surface and scanning it while moving so as to detect the evanescent wave with the same intensity, the structure of the surface on the basis of such movement and at the same time through light absorption, spectral information of the sample itself can be examined. In this case, the resolving power in the interplanar direction is about 1 nm. Therefore, by applying PSTM, it is possible to perform reproduction of a high density recording medium sufficiently on the order of nanometers. Also, in reproduction by use of light, even a recorded state in which a part of the structure within the molecule may locally change can be observed as the change of the light absorption wavelength of the whole molecule.

Since recording and reproduction are performed by a separate means by combination of STM and PSTM having such specific features as described above, there is no longer any change on the recorded state during reproduction. Further, in performing reproduction by use of evanescent waves with a plurality of wavelengths, by choosing a wavelength showing no change in light absorbance of the medium between before and after recording for one wavelength and performing the longitudinal direction position control of the optical probe during recording and reproduction so that the intensity of the evanescent wave with that wavelength may be constant, it becomes possible to perform stable recording and reproduction. Also, by use of the ratio of the evanescent wave intensity of another wavelength to the evanescent wave intensity of that wavelength as the reproduction signal, the unevenness on the substrate or the recording medium surface and the recorded state become separable, whereby reproducibility and stability become sufficient.

DESCRIPTION OF THE PREFERRED EMBODIMENT

Figure 1:
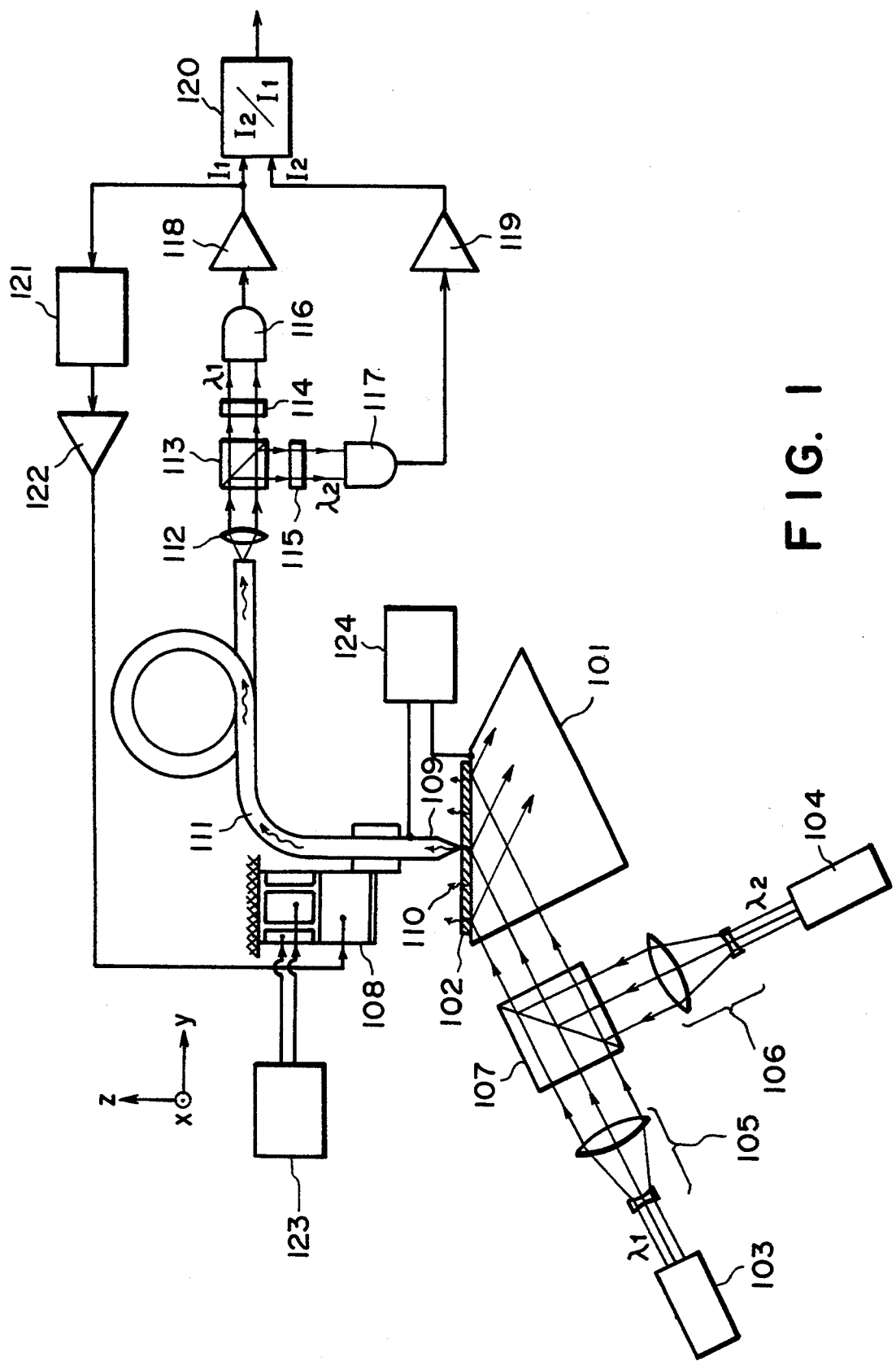
FIG. 1 is a block diagram showing the constitution of the information processing device according to an example of the present invention.

Referring now to the drawing, the present invention is described in detail.

In FIG. 1, as the recording medium 102, for example, built-up films of monomolecular film layer are formed according to the Langmuir-Blodgett method by use of 10,12-pentacosadiynic acid $CH_3(CH_2)_{11}C\equiv C-C\equiv C(CHC_2)_8COOH$, amphiphilic diacetylene derivative, on the surface of an electroconductive prism 101 and a polymer is formed by irradiation of X-ray or gamma-ray. Here, as the material for the electroconductive prism 101, $Ag_2O-AgI-MoO_3(-P_2O_5)$ type super-ion conducting glass, a glass containing a polyvalent element such as palladium, iron, etc., or one coated on the glass surface with a thin film composed mainly of $SnO_2$ may be employed.

As shown in FIG. 1, the light with wavelength $\lambda_1$ generated from the light source 103 and the light with wavelength $\lambda_2$ generated from the light source 104 are respectively passed through the beam expanders 105, 106 and the beam mixer 107 to be combined, and permitted to enter the surface of the recording medium 102 in contact with the electroconductive prism 101 under the total reflection condition. On the other hand, by the xyz position control device 108, the electroconductive optical probe 109 is approximated to a distance of about a sub-nanometer to the desired position of the recording medium 102. Here, as the electroconductive optical probe, one prepared by polishing one end of an optical fiber made of the same material as the electroconductive prism 101 to have the tip end pointed (radius of curvature<1 μm) is used. The evanescent light 110 having thus passed through the recording medium 102 to be oozed out (existing only in the vicinity of the surface) is detected by the electroconductive optical probe 109, introduced into the optical fiber 111, passed through the lens 112, the beam splitter 113, the filters 114, 115 to be divided into the components with wavelengths $\lambda_1$ and $\lambda_2$, which are respectively converted by photo-multipliers 116, 117 into electrical signals. The electrical signals are amplified in the amplifiers 118, 119 ($I_1$, $I_2$), then inputted in the dividing circuit 120 to make the ratio $I_2/I_1$ of the two signals the reproduction signal. Here, the Z-directional position control of the optical probe 109 during recording and reproduction is performed as follows. The signal $I_1$ for the detection light intensity of the wavelength $\lambda_1$ is inputted in the feedback circuit 121, the deviation from the set (light intensity) value is calculated, and after amplification in the amplification circuit 122, as the Z position control signal, by the xyz position control device 108, the Z-directional position of the optical probe 109 is controlled so as to become the set light intensity.

Next, recording and reproduction methods to the recording medium 102 are described. By use of the xy position control circuit 123 and the xyz position control device 108, the optical probe 109 is moved to the desired position of the recording medium 102, and a pulse voltage for recording is applied by the recording signal circuit 124 between the electroconductive optical probe 109 and the electroconductive prism 101 to inject locally electrons into the recording medium. Then, a structural change takes place in the diacetylene derivative polymer through the Joule's heat by the local current, whereby the peak of the absorption band of light is shifted from 640 nm to 580 nm. Now, by use of a light with a wavelength of 780 nm of the GaAlAs semiconductor laser for the light source 103, a light of 633 nm of the helium neon laser of the light source 104, substantially no change will occur in absorbance for the light with wavelength of 780 nm, whereby there is substantially no change in the signal intensity $I_1$, while for the light with wavelength 633 nm, absorbance changes greatly, whereby the signal intensity $I_2$ changes greatly, and therefore the recorded state can be read by detecting the reproduction signal $I_2/I_1$. Here, since $I_1$ changes only slightly depending on the recorded state, during movement of the optical probe 109 in the xy two-dimentional direction relative to the recording medium 102 during recording and reproduction, it becomes possible to control stably Z directional position of the optical probe 109 corresponding to the true unevenness of the medium surface. On the contrary, since $I_2$ changes similarly even when $I_1$ may change even slightly corresponding to the unevenness of the medium surface, the reproduction signal $I_2/I_1$ does not change corresponding to the unevenness of the medium surface, whereby reproduction can be made without receiving influence from the unevenness of the medium surface.

Having described an example of the diacetylene derivative polymer as the recording medium in this embodiment, a material of which the absorption band of light can be shifted by electron injection or Joule's heat by current may be available, and otherwise, one decomposable by current Joule's heat such as a J associated product of a dye such as squatilium bis-6 octylazulene, etc. (absorption band at wavelength 579 nm to be shifted to 890 nm): or one reduced as follows by electron injection such as polyimide:

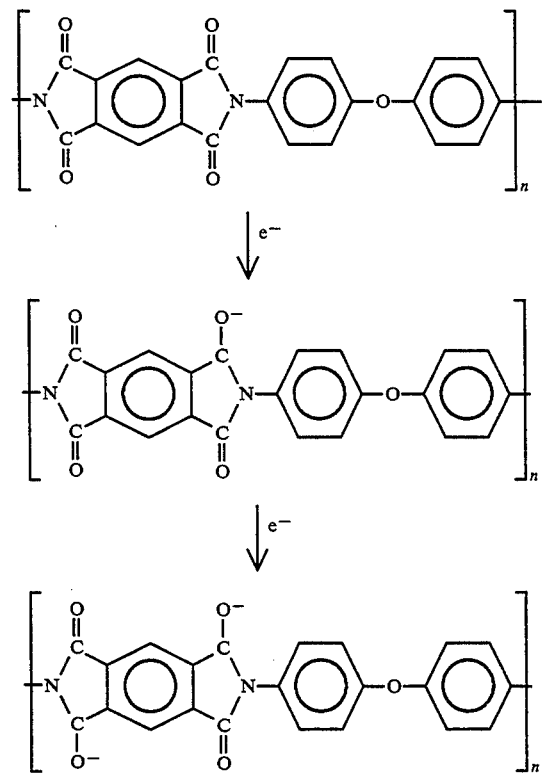

or one which is greatly changed in absorbance at around 800 nm by intramolecular charge transfer such as copper tetracyanoquinodimethane by electron injection as shown below:

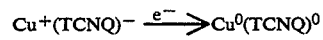

may be employed.

As described above, according to the present invention, by performing reproduction by detecting evanescent light (oozed-out light) including a plurality of wavelengths from the totally reflected light irradiated on the back surface of a recording medium, (1) the unevenness and the recorded state on the recording medium surface can be distinguished from each other to enable stable position control in the Z direction of the optical probe during recording and reproduction, whereby reproduction with good S/N ratio is rendered possible.

Also, according to the present invention, by performing recording with electron injection and current Joule's heat by voltage application, and performing reproduction by detection of the evanescent light from the totally reflected light irradiated on the back surface of a recording medium, (2) recording with sufficiently small bit diameter is possible;

(3) since even the recorded state such as the local structural change within the molecule can be taken as the absorbance change of the molecule as a whole by optical detection, whereby reproduction with good precision is rendered possible;

(4) since recording/reproduction are performed by separate means, there is no fear of erroneous writing during reproduction.

What is claimed is:

1. An information processing device comprising:
   an electroconductive substrate for transmitting an electromagnetic wave;
   a recording layer provided on a surface of said substrate;
   an electroconductive optical probe arranged proximate to said recording layer, said electroconductive optical probe including a pointed tip end having a radius of curvature of at most 1 $\mu$m;
   means for applying a recording voltage between said substrate and said optical probe as an input signal;
   means for irradiating an electromagnetic wave having a predetermined wavelength into said substrate, the electromagnetic wave undergoing total reflection at the surface of the substrate and oozing out through the surface and said recording layer as evanescent light; and
   means for detecting the evanescent light entering said optical probe through said pointed tip end as an output signal,
   wherein said recording layer exhibits an absorbance for the evanescent light which changes by application of the recording voltage.

2. An information processing device comprising:
   an electroconductive substrate for transmitting electromagnetic waves;
   a recording layer provided on a surface of said substrate;
   an electroconductive optical probe arranged proximate to said recording layer, said electroconductive optical probe including a pointed tip end having a radius of curvature of at most 1 $\mu$m;
   means for applying a recording voltage between said substrate and said optical probe as an input signal;
   means for irradiating at least two electromagnetic waves having different wavelengths into said substrate, the electromagnetic waves undergoing total reflection at the surface of the substrate and oozing out through the surface and said recording layer as evanescent lights;
   detecting means for detecting the respective evanescent lights entering said optical probe through the pointed tip end; and
   means for calculating an intensity ratio of the detected evanescent lights as an output signal,
   wherein said recording layer exhibits a first absorbance for one of the evanescent lights which changes by application of the recording voltage and a second absorbance for another one of the evanescent lights which is unchanged by application of the recording voltage.

3. An information processing device according to claim 2, further comprising means for controlling the distance between the optical probe and the recording medium to maintain constant an intensity of one of the evanescent lights detected by said detecting means.

4. An information processing method comprising:
   providing a recording layer on a surface of an electroconductive substrate, the substrate being capable of transmitting an electromagnetic wave having a predetermined wavelength and the recording layer exhibiting an absorbance for the electromagnetic wave which changes by application of a recording voltage;
   approximating to the recording layer an electroconductive optical probe that includes a pointed tip end having a curvature of at most 1 $\mu$m;
   applying the recording voltage between said substrate and said optical probe to record information; and
   irradiating the electromagnetic wave into the substrate such that the electromagnetic wave undergoes total reflection at the surface of the substrate and oozes out through the and the recording layer as evanescent light, while detecting the evanescent light entering the optical probe through the pointed tip end to read the recorded information.

5. An information processing method comprising:
   providing a recording layer on a surface of an electroconductive substrate, the substrate being capable of transmitting at least two electromagnetic waves having different wavelengths, the recording layer exhibiting a first absorbance for one of the electromagnetic waves which changes by application of a recording voltage and a second absorbance for another one of the electromagnetic waves which is unchanged by application of the recording voltage;
   approximating to the recording layer an electroconductive optical probe that includes a pointed tip end having a radius of curvature of at most 1 $\mu$m;
   applying the recording voltage between said substrate and said optical probe to record information;
   irradiating the electromagnetic waves into the substrate such that the electromagnetic waves undergo total reflection at the surface of the substrate and ooze out through the surface and the recording layer as evanescent lights, while detecting the respective evanescent lights entering the optical probe through the pointed tip end; and
   calculating an intensity ratio of the detected evanescent lights to read the recorded information.

6. An information processing method according to claim 5, further comprising controlling the distance between the optical probe and the recording medium to maintain constant an intensity of one of the evanescent lights detected in said detecting step.

7. An information processing device comprising:
   a recording medium having information recorded thereon, said recording medium comprising a substrate and a recording layer provided on a surface of the substrate;
   an optical probe arranged proximate to said recording layer, said optical probe including a pointed tip end having a radius of at most 1 $\mu$m ;
   means for irradiating at least two electromagnetic waves having different wavelengths into the substrate such that the electromagnetic waves undergo total reflection at the surface of the substrate and ooze out through the surface and the recording layer as evanescent lights;

detecting means for detecting the respective evanescent lights entering said optical probe through the pointed tip end; and means for calculating an intensity ratio of the detected evanescent lights to read the recorded information, wherein the recording layer exhibits a first absorbance for one of the evanescent lights which varies according to the recorded information and a second absorbance for another one of the evanescent lights which is substantially constant regardless of the recorded information.

8. An information processing device according to claim 7, further comprising means for controlling the distance between said optical probe and the recording medium to make constant an intensity of one of the evanescent lights detected by said detecting means.

9. An information processing method comprising:

providing a recording medium having information recorded thereon, the recording medium comprising a substrate and a recording layer provided on a surface of the substrate;

approximating an optical probe to the recording layer, the optical probe including a pointed tip end having a radius of curvature of at most 1 μm;

irradiating at least two electromagnetic waves having different wavelengths into the substrate such that the electromagnetic waves undergo total reflection at the surface of the substrate and ooze out through the surface and the recording layer as evanescent lights;

detecting the respective evanescent lights entering the optical probe through the pointed tip end; and calculating an intensity ratio of the detected evanescent lights to read the recorded information, wherein the recording layer exhibits a first absorbance for one of the evanescent lights which varies according to the recorded information and a second absorbance for another one of the evanescent lights which is substantially constant regardless of the recorded information.

10. An information processing device according to claim 1, wherein said electroconductive optical probe is made of one material that is both optically transparent and electrically conductive.

11. An information processing device according to claim 2, wherein said electroconductive optical probe is made of one material that is both optically transparent and electrically conductive.

12. An information processing method according to claim 4, wherein the electroconductive optical probe is made of one material that is both optically transparent and electrically conductive.

13. An information processing method according to claim 5, wherein the electroconductive optical probe is made of one material that is both optically transparent and electrically conductive.

* * * * *

UNITED STATES PATENT AND TRADEMARK OFFICE
CERTIFICATE OF CORRECTION

PATENT NO. : 5,343,460
DATED : August 30, 1994
INVENTOR(S) : Toshihiko MIYAZAKI, et al.

It is certified that error appears in the above-indentified patent and that said Letters Patent is hereby corrected as shown below:

COLUMN 1:

Line 6, "invention" should read --Invention--; and
    Line 52, "near field" should read --near-field--.

COLUMN 2:

Line 40, "process" should read --processes--.

COLUMN 5:

Line 55, "therefore" should read --therefore,--.

COLUMN 6:

Line 9, "squatilium" should read --squarilium--; and
    Line 11, "890 nm):" should read --890 nm),--.

COLUMN 8:

Line 20, "the" (first occurrence) should read --the surface--.

Signed and Sealed this

Twenty-eight Day of March, 1995

Attest:

BRUCE LEHMAN

*Attesting Officer*   *Commissioner of Patents and Trademarks*